April 5, 1927.
H. H. MORGAN
MECHANICAL TOY
Filed Sept. 25, 1926
1,623,886
2 Sheets-Sheet 1
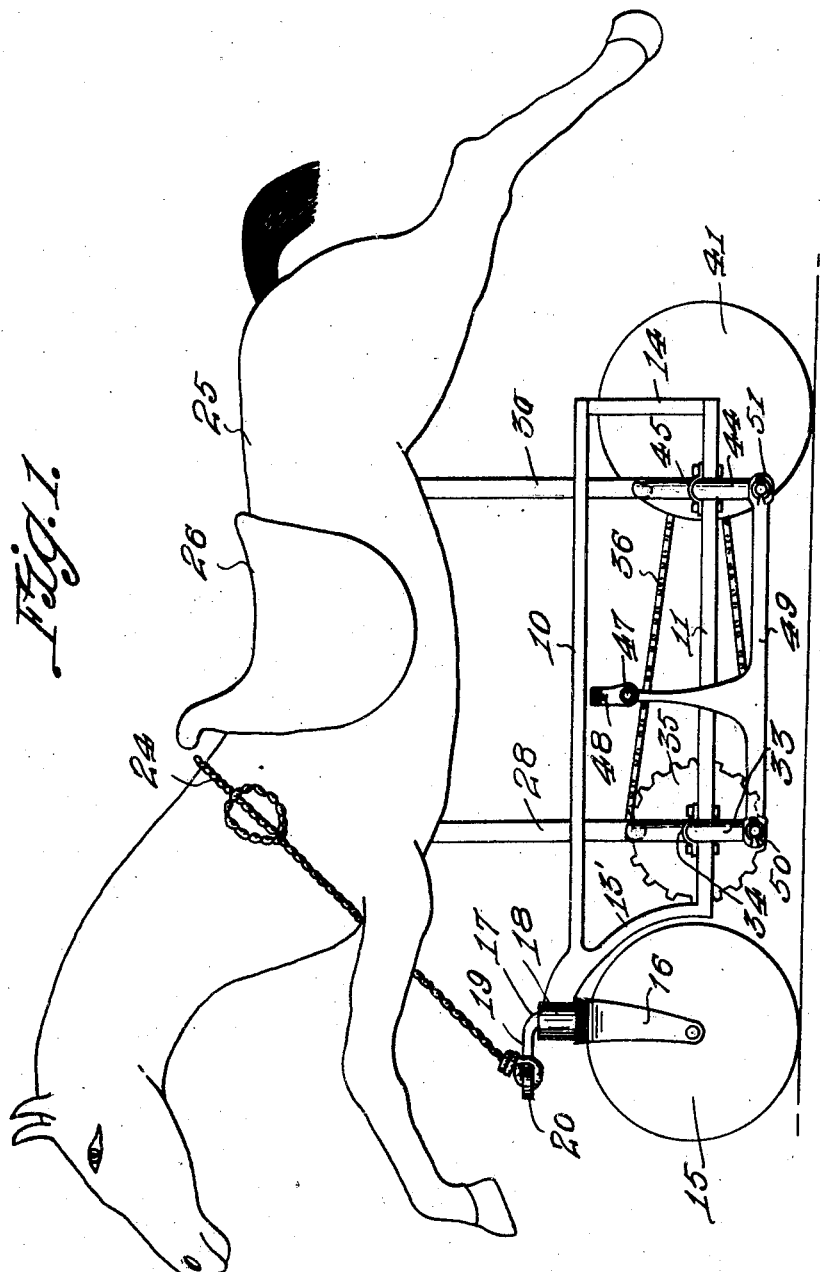
Howard H. Morgan, INVENTOR
BY Victor J. Evans
ATTORNEY
WITNESS:

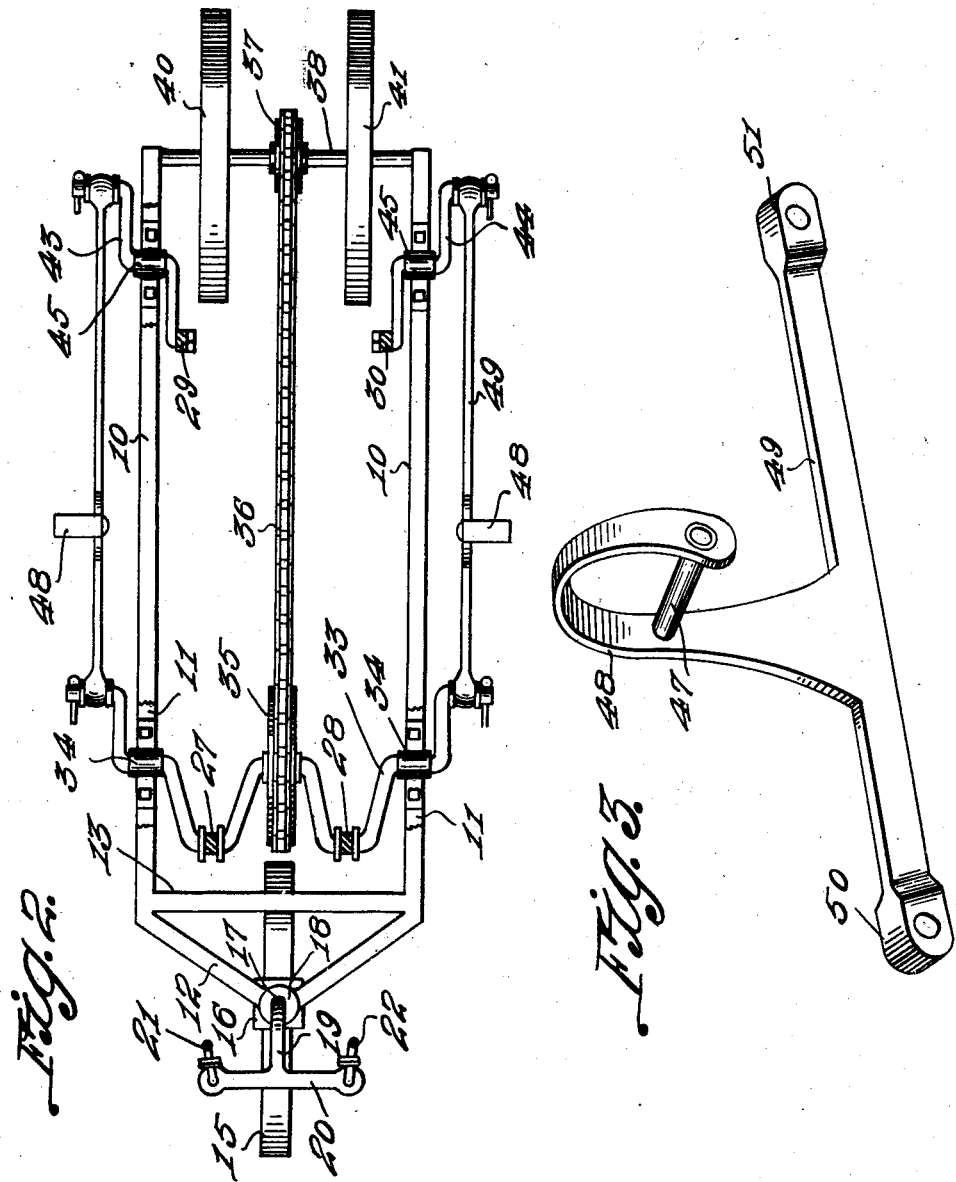

Patented Apr. 5, 1927.

1,623,886

UNITED STATES PATENT OFFICE.

HOWARD H. MORGAN, OF HOLLYWOOD, CALIFORNIA.

MECHANICAL TOY.

Application filed September 25, 1926. Serial No. 137,770.

The object of this invention is to provide a toy in which the moving figure represents a race horse, a special mechanical drive being provided and serving to propel the toy and to impart other movements thereto, so that the device will be as interesting and realistic as possible.

A further object is to provide a device including a frame mounting a forward wheel, to be guided by the rider, and rear wheels mounted on an axle driven from a crank shaft to which motion is imparted by elements having stirrups fixed thereto,—the figure representing the horse being so mounted that it will be raised by the weight of the rider on the stirrups, while his weight when seated in the saddle provides for the downward movement.

With the foregoing and other objects in view, the invention consists in the novel construction and arrangement of elements described, illustrated and claimed, it being understood that modifications may be made within the scope of the claim without departing from the spirit of the invention.

In the drawings forming part of this application,

Figure 1 is a view of the device in side elevation.

Figure 2 is a horizontal section thru the elements connecting the forward crank shaft with the body of the animal and the elements connecting the rear cranks with said body.

Figure 3 is a perspective view showing one of the elements constituting a combined stirrup and propelling device.

In carrying out the invention, I provide a frame including the upper side bars 10, the lower side bars 11 and the forward portion 12. Transverse braces such as 13 are provided wherever needed, and elements 13' connect the upper portion of the frame at the forward part thereof, with the lower part. One of the vertical braces at the rear portion of the frame is designated 14.

A forward wheel 15 is mounted in a fork 16, and a standard 17 formed with the fork passes thru the socket portion 18 of the frame. An arm 19 extends laterally from the standard 17 and a transverse bar 20 has connected therewith the opposite ends 21 and 22 of the flexible guiding element or rein 24.

The body of the animal or race horse is designated 25, and a saddle is shown at 26. Connected with the body 25 are downwardly extending bars 27, 28, 29 and 30, and these elements last mentioned have connection with a forward crank shaft and with rear crank elements referred to below.

A forward crank shaft 33 is mounted in bearings 34 in the frame, and carries a sprocket wheel 35 fixed thereon, this wheel imparting motion to chain 36 engaging sprocket wheel 37 on rear shaft or axle 38. This element last named mounts wheels 40 and 41, constituting ground wheels, and thru which the entire device is propelled over the surface of the floor or ground.

Rear cranks 43 and 44 are mounted in bearings 45 on the frame, and these cranks are pivotally connected with upwardly extending bars 29 and 30 connected with the body of the animal, as before indicated. The forward crank shaft 33 imparts movement to the forward upwardly extending bars 27 and 28, also connected with the body of the animal. The forward and rear crank elements have the relative position illustrated in Figure 2, and movement is imparted to the figure representing the horse, in an obvious manner when the crank elements are rotated.

One of the combined stirrups and propelling devices is shown in perspective in Figure 3, and includes the stirrup per se including the lower bar 47 on which the foot rests. The portion 48 extends upwardly and is curved to form a U-member, the outer end receiving one end of bar 47. Element 48 is formed with or is mounted on a bar 49 having its opposite ends 50 and 51 apertured as shown, to permit of the reception of the end or ends of the crank shaft 33 and of the crank elements 43 and 44. The connections at 50 and 51 form a type of bearing, and the element 49 corresponds with a connecting rod of the type employed when transforming reciprocating motion to rotary motion, or vice versa.

When the rider is seated in saddle 26, his weight tends to move the element representing the horse downwardly, and when the rider throws his weight on the stirrups, the element 25 will move upwardly, and at the same time a continuous drive will be imparted to crank shaft 33 and to crank elements 43 and 44, by the feet and legs of the rider, when he makes use of the device in the manner intended.

Having described the invention what is claimed is:—

In a device of the class described, a frame, a crank shaft mounted thereon, guiding means carried by the frame, means controlling the guiding means, wheels for mounting the frame, means for driving the wheels from the crank shaft, additional crank elements mounted on the frame, a body positioned above the frame, rods connecting the body with the crank shaft and additional crank elements, stirrups, and means connected with the stirrups for imparting movement to the crank shaft and crank elements.

In testimony whereof I affix my signature.

HOWARD H. MORGAN.